United States Patent [19]
Allegre

[11] Patent Number: 5,575,096
[45] Date of Patent: Nov. 19, 1996

[54] INFORMATION SUPPORT SLEEVE, ITS METHOD OF MANUFACTURE, AND CONTAINERS EQUIPPED WITH SUCH A SLEEVE

[75] Inventor: André Allegre, Dardilly, France

[73] Assignee: Decomatic S.A., societe anonyme, France

[21] Appl. No.: 198,299

[22] Filed: Feb. 18, 1994

[30]     Foreign Application Priority Data

Feb. 19, 1993 [FR] France ................................. 93 01906

[51] Int. Cl.⁶ ....................................................... G09F 3/08
[52] U.S. Cl. ................................................ 40/306; 40/324
[58] Field of Search ........................ 40/306, 324; 283/81, 283/105

[56]                 References Cited

U.S. PATENT DOCUMENTS

| Re. 34,366 | 9/1993 | Instance | 40/306 X |
|---|---|---|---|
| 1,924,909 | 8/1933 | Brown | 40/306 |
| 2,093,985 | 9/1937 | Stansbury | 40/306 |
| 2,706,865 | 4/1955 | Miller | 40/306 |
| 3,750,317 | 8/1973 | Morgan | 283/81 X |
| 3,863,373 | 2/1975 | Kaercher et al. | 40/306 |
| 4,312,523 | 1/1982 | Haines | 283/81 X |
| 4,551,373 | 11/1985 | Conlon | 40/306 X |
| 5,207,458 | 5/1993 | Treichel et al. | 40/306 X |
| 5,207,746 | 5/1993 | Jones | 40/306 X |
| 5,234,735 | 8/1993 | Baker et al. | 40/306 X |
| 5,342,093 | 8/1994 | Weernink | 283/81 |

FOREIGN PATENT DOCUMENTS

| 1043230 | 11/1953 | France . |
|---|---|---|
| 3924790 | 2/1991 | Germany . |
| 92/02421 | 2/1992 | WIPO . |

*Primary Examiner*—Joanne Silbermann
*Attorney, Agent, or Firm*—Larson and Taylor

[57]                ABSTRACT

A sleeve for placement around a container utilizes a single continuous sheet of plastic which is folded into an enclosed shape having a front side, a back side and an overlapping section extending over the front side to form a sleeve body. This enclosed shape is held together by welds formed through adjacent edges of the front and back sides and the overlapping section. At least one precut is formed in the overlapping section. This precut extends parallel to the welds to allow for detachment of a portion of the overlapping section such that the front side is visible. Information can be printed both on the overlapping section and on the front and back sides, so that the sleeve of the invention has a larger surface area for printing than conventional sleeves which include only front and back portions.

6 Claims, 1 Drawing Sheet

— 5,575,096 —

INFORMATION SUPPORT SLEEVE, ITS METHOD OF MANUFACTURE, AND CONTAINERS EQUIPPED WITH SUCH A SLEEVE

FIELD OF THE INVENTION

The present invention relates to plastic sleeves intended to be placed around a container such as a can or the like, in order to constitute an information support. Generally, these sleeves are formed of a body made from a sheet of plastic which is shaped to fit around the perimeter of the container, for example in cylindrical form. The present invention also relates to a method for manufacturing sleeves of this type, as well as to the containers which are equipped therewith.

BACKGROUND OF THE INVENTION

Plastic sleeves have the drawback of exhibiting a limited surface for displaying information relating to the product contained in the container. That is more particularly true in the field of phytopathological products, delivered as a powder or as a liquid in cans and where, for reasons of legislation, manufacturers are constrained to exhibit increasingly numerous indications.

In the field of paper labels, labels are known equipped with a removable part making it possible to increase the surface for displaying information.

Thus, International Patent Application WO 92/0241 describes a label formed of a sheet of paper closed up on itself via two of its edges and extending in a removable part which is attached or made as a single piece with the sheet placed around the support. At its free edge, the removable part is equipped with one-use spots of glue, whereas at its other edge it may be equipped with a precut.

French Patent Application No. 1 043 230 also describes a paper label which is fixed around a container by bonding two of its edges to one another and which is extended by a removable part joined to the rest of the label by an adhesive means at one of its edges and by a precut at its opposite edge.

What is more, the German Patent Application No. 3 924 790 describes a label consisting of a lower sheet intended to be stuck to the perimeter of a container and of an upper sheet fixed to the previous one by one edge, the opposite edge being equipped with a contact adhesive allowing it to be unstuck several times.

In the field of plastic sleeves, the use of complementary information means of the adhesive pouch type has been developed, in which pouch a complementary notice is inserted that the manufacturer affixes to the sleeve proper, which is relatively expensive and entails risks of these pouches becoming pulled off during transport and handling of the cans.

SUMMARY OF THE INVENTION

The objective of the present invention is to overcome the drawbacks of plastic sleeves of the prior art by providing a sleeve possessing a surface area for displaying information which is greatly increased in comparison with conventional sleeves, particularly of the order of 50 to 100%, or even more, whilst exhibiting a good safety of use.

Another objective of the invention is to provide this improved sleeve, the cost price of which is not significantly increased in comparison with actual conventional sleeves.

Yet another objective of the invention is to provide such a sleeve which is easy to implement, especially starting from a single piece of plastic.

Yet another objective of the invention is to propose a simple and rapid method for continuously manufacturing these sleeves from a reel of plastic film or sheath.

The subject of the invention is therefore a sleeve intended to be placed around a container such as a can or the like in order to constitute an information support and formed by a body made of a sheet of plastic which is shaped, especially by stretching or shrinking, to fit around the perimeter of the container and capable of receiving printing on its outside, the sleeve furthermore including a part which is affixed removably to the sleeve body, wherein said sleeve has a removable part of large surface area capable of receiving or exhibiting printing on at least one of its faces and rendered integral with the sleeve body via those two of its edges which are parallel to the generatrix of the sleeve body, whereas a precut, or similar detachment means, is provided on the removable part in order to detach it close to one of its two edges. Large surface is understood especially to mean more than approximately half of the perimeter of the sleeve body, preferably approximately half. Preferably the edges of the removable part are secured to the sleeve body by welding.

Thus, indications may be carried on the entire perimeter of the sleeve and on one or both faces of the removable part which, advantageously, may be detached at just one or both of its edges.

It is understood that this sleeve may be produced equally well from a sheet of plastic or from a sheath or even a very long film of plastic, although the latter solution is industrially more appropriate. What is more, given that plastics usually used for manufacturing sleeves require a particular surface treatment, such as a high frequency luminous discharge treatment termed corona treatment, to make them capable of receiving printing, and that two surfaces thus treated tend to stick to one another if superimposed, a particular embodiment of the invention makes provision for the removable part to be formed of two plastic sheets or sheet parts, the external face of each of which being capable of receiving printing.

Preferably the sleeve body and the removable part are obtained from one and the same sheet of plastic.

The subject of the invention is also a method for manufacturing sleeves intended to be placed around a container such as a can or the like in order to constitute an information support, wherein a sleeve body shaped to fit around the perimeter of the container is produced from a sheet of plastic and wherein a removable part made from a sheet of plastic which is secured to the sleeve body by two edges parallel to the generatrix of said sleeve body by a securing means such as welding or the like is affixed to the sleeve body, in such a fashion that the removable part covers over all or part of the sleeve body and a precut, or a similar detachment means, is made in the removable part in the vicinity of said edges to allow the removable part to be detached.

Preferably, the sleeve body and/or the removable part are produced from a sheet of plastic. If necessary, the sheet of plastic may receive, on one of its faces, a conventional treatment rendering it capable of receiving printing, such printing preferably being carried out before the sleeve is shaped.

According to a first embodiment of the method according to the invention, the sleeve body and the removable part are produced from one and the same sheet of plastic divided longitudinally into three parts, a central part surrounded by two lateral parts, in which method, by folding, a first lateral part is folded over onto the central part then the second lateral part, intended to form the removable part, is folded over the first one, bringing the free edge of this second part into the vicinity of the fold line between the other two sheet parts, the three sheet parts are welded together longitudinally in the vicinity of each of the two fold lines and, in the vicinity of the welds thus formed, a precut is made in the lateral part intended to form the removable part.

It is possible to envisage various variants of the sleeve according to the invention, for example by producing the sleeve body and the removable part from one and the same sheet of plastic which is folded in half beforehand, or from a sheath of plastic, so as to produce a removable part formed of two thicknesses of sheet. In this case, the method may make provision, starting from the sheath or the two thicknesses of sheet, to produce a fold in order to have four thicknesses of sheet and to carry out appropriate welds and precuts in order to obtain the actual sleeve body from two thicknesses of sheet and, from the other two thicknesses of sheet, to obtain the removable part. It will be understood that according to the arrangement of the welds and precuts, the removable part may be exhibited, for example, in the form of a sheath, in the form of a double sleeve to be opened out, or as two removable sheet parts.

It is preferable for the sheet of plastic, advantageously stretchable, to be made of polyethylene and to have received, on its face intended to point towards the outside when the sleeve is in place on a container, a conventional treatment allowing it to receive printing, such as a corona treatment.

Preferably, the sleeves are manufactured continuously from a preprinted film in the form of a reel, which may receive precutting for separating sleeves. It is also possible to work from a sheath or from a film which is folded in half beforehand in the direction of the length.

The subject of the invention is also sleeves capable of being obtained by the implementation of this method as well as the containers equipped with the sleeves according to the invention.

BRIEF DESCRIPTION OF THE DRAWINGS

The invention will now be described in more detail with the aid of one embodiment of the method according to the invention, described in conjunction with the drawing. The latter shows.

DETAILED DESCRIPTION OF THE PREFERRED EMBODIMENT

Figure 1:
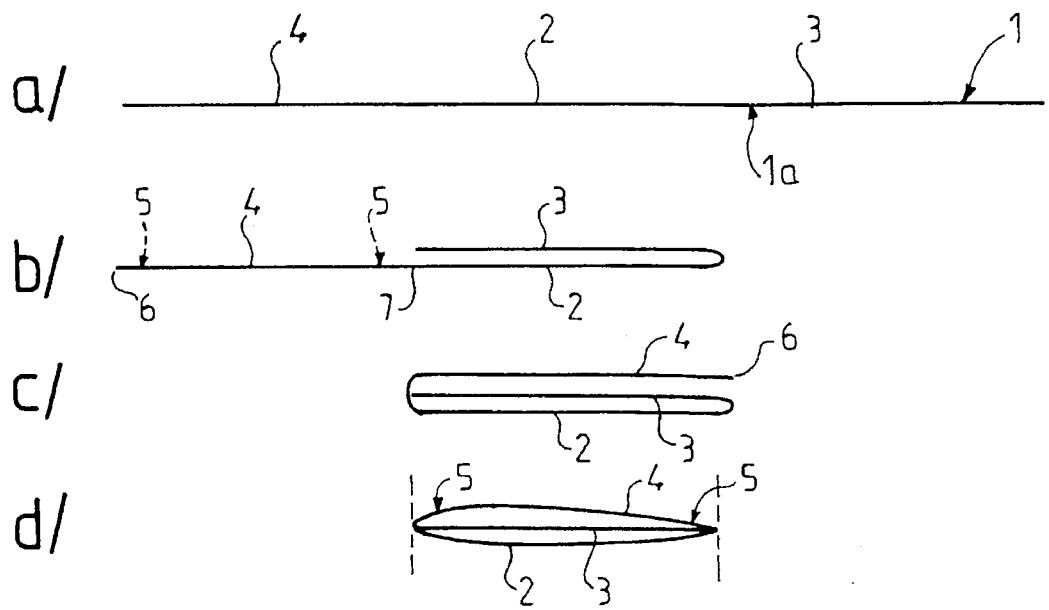
in FIG. 1, the steps a) to d) of a method according to the invention.

In the method represented in FIG. 1, starting at a) with a film of stretchable polyethylene 1 the width of which is a little more than 1.5 times (without taking account of offcuts) the perimeter of the can for which the sleeve is intended. The lower face 1a of this film has been printed beforehand after an appropriate surface treatment.

The method is carried out continuously from a reel of preprinted film. The film 1 is divided longitudinally into three substantially equal parts, a central part 2 and two lateral parts 3 and 4.

Step b) is an operation of folding or plying bringing the lateral part 3 above the central part 2 with which it will form the sleeve body. Before or after this step, two precuts 5 are made close to the longitudinal edges 6 and 7 of the lateral part 4. In c), a second folding operation brings the lateral part 4, intended to form the removable part, above the lateral part 3. Then, in d), the sleeve is finished off and made up to the correct width by an operation of welding the three thicknesses of film, followed by cutting of the weld edges (not represented).

Figure 2:
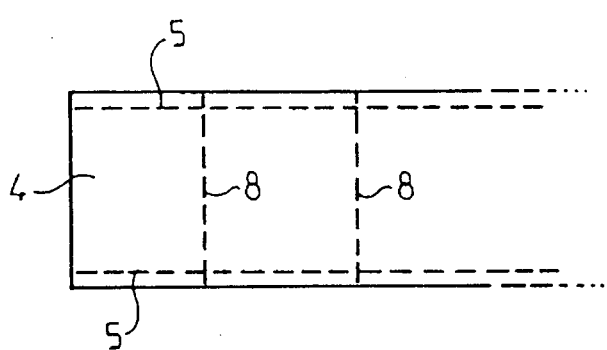
in FIG. 2, a partial plan view of a strip including several sleeves obtained by the method according to FIG. 1.

A precut 8 is made transversely to the longitudinal direction of the film in order to separate the sleeves: FIG. 2. This operation may be carried out continuously or discontinuously.

Figure 3:
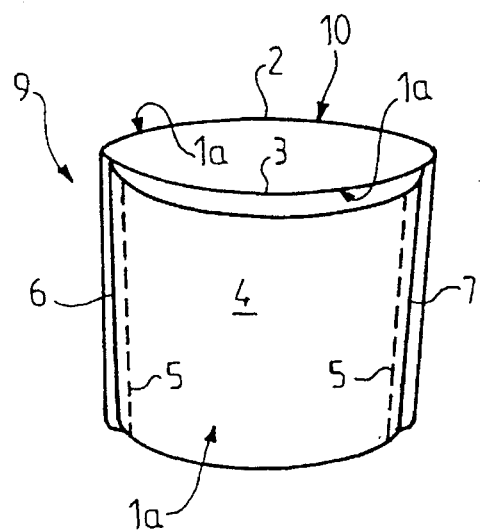
in FIG. 3, a perspective view of a sleeve obtained by the method according to FIG. 1.

FIG. 3 represents a sleeve 9 obtained by this method and in which the cylindrical sleeve body 10 and the removable part 4 can be recognised. If reference is again made to FIG. 1, it is understood that the printed lower face 1a of the film now constitutes the external perimeter of the sleeve and the external face of the removable part.

The removable part, which constitutes an additional surface, may be detached in order to gain access to the information featured on the sleeve body. It may be used as a complementary information support or even, for example, as a savings coupon, image to be collected, or games support (puzzle, . . . ), information support to be returned to the manufacturer (by the vendor during the act of selling, or by the customer after the act of purchasing), etc.

Although the invention has been described in conjunction with a particular embodiment of the method for manufacturing sleeves, it goes without saying that it is in no way limited either to this mode, or to the sleeves directly obtained.

I claim:

1. A sleeve including a sleeve body comprising a single continuous sheet of plastic forming an enclosed shape having a front side, a back side and an overlapping section extending over said front side, said enclosed shape including parallel welds extending through adjacent edges of said front and back sides and said overlapping section, said sleeve body being capable of receiving printing thereon, said overlapping section including at least one precut extending parallel to said welds for detaching a portion of said overlapping section whereby said front side is visible.

2. The sleeve according to claim 1 wherein the overlapping section extends over at least half the perimeter of the enclosed shape.

3. The sleeve according to claim 1, wherein the overlapping section comprises two layers each having external faces for receiving printing thereon, said two overlapping sections being separately detachable.

4. The sleeve according to claim 1, comprising polyethylene.

5. The sleeve according to claim 1 wherein the enclosed shape comprises a cylinder.

6. The sleeve according to claim 1, wherein the sleeve body comprises two layers of plastic sheets each having external faces for receiving printing thereon.

* * * * *